United States Patent [19] [11] 4,119,424
Comperatore [45] Oct. 10, 1978

[54] METHOD AND APPARATUS FOR SHAPING GLASS SHEETS ON A BENDING MOLD

[75] Inventor: John A. Comperatore, Natrona Heights, Pa.

[73] Assignee: PPG Industries, Inc., Pittsburgh, Pa.

[21] Appl. No.: 803,015

[22] Filed: Jun. 3, 1977

[51] Int. Cl.² ............................................. C03B 23/02
[52] U.S. Cl. ......................................... 65/107; 65/24; 65/286; 65/287
[58] Field of Search ................. 65/24, 26 R, 106, 107, 65/286, 287

[56] References Cited
U.S. PATENT DOCUMENTS

| 2,377,849 | 6/1945 | Binkert et al. | 65/106 |
| 3,560,182 | 2/1971 | Golightly | 65/107 |
| 3,607,186 | 9/1971 | Bognar | 65/273 X |

Primary Examiner—Arthur D. Kellogg
Attorney, Agent, or Firm—Dennis G. Millman; Edward I. Mates

[57] ABSTRACT

A method and apparatus for shaping glass sheets by gravity sagging using a pair of oblique slides to support an opposite pair of edges of a flat glass sheet, which is supported on said slides in shaping relation over an outline shaping mold and heated until it sags to conform to the upward facing shaping surface of the mold disposed between and below said slides. The gist of the present invention is to selectively apply cooling fluid against the glass sheet adjacent one of the opposite glass sheet side edges whenever the opposite side edge begins to slide and sag an observable amount more than the adjacent side edge. The selective application is discontinued when both of the glass sheet edges are in approximate horizontal alignment with one another. If necessary, this process is repeated throughout the gravity sagging operation, thereby ensuring that the glass sheet comes to rest on the peripheral shaping surface of the outline mold in proper alignment therewith.

7 Claims, 5 Drawing Figures

METHOD AND APPARATUS FOR SHAPING GLASS SHEETS ON A BENDING MOLD

BACKGROUND OF THE INVENTION

1. Field of the Invention

This invention relates to shaping glass sheets and has special utility for shaping glass sheets into certain cylindrical and conical shapes that are either used as components of laminated aircraft transparencies or as molds for press polishing shaped transparent components of plastic composition that are incorporated in aircraft transparencies. A glass sheet shaped to a particular cylindrical configuration produced according to the present invention either forms a press polishing mold for press polishing a transparent element of a laminated transparency, for example one found in the B1 aircraft, or forms a component to be laminated to other layers of glass and/or plastic material to form a laminated transparency. Another embodiment of the present invention provides a glass sheet of conical shape that is either used to press polish plastic components of conical shape to be laminated to form a laminated transparency, of which parts for the F-111 aircraft are typical, or for a component to be incorporated in conically shaped laminated transparencies that contain a glass component layer.

The number of parts that have to be shaped for use in aircraft transparencies or for making press polishing molds used to press polish aircraft transparency components is not so great as to warrant the use of high production equipment used to shape windshields, backlights and curved sidelights for automobiles. Therefore, parts destined for use in fabricating aircraft transparencies, either directly (as in components to be laminated) or indirectly (as in shaped molds to press polish components), are usually shaped during fabrication by gravity sagging in a kiln.

In the usual process of gravity sagging, glass sheets are heated to a deformation temperature, which varies for different thicknesses of glass from about 1050° F. (approximately 566° C.) to about 1200° F. (approximately 649° C.). For example, commercial float glass about 1/4 inch (6.35 millimeters) thick has a deformation temperature of about 1080° F. (approximately 582° C.) and thicker sheets of the same composition having a thickness of three-quarters of an inch (19 millimeters) have a deformation temperature of more than 1200° F. (which approximates 649° C.).

Components for large aircraft transparencies and molds for press polishing said components are usually shaped in a batch type process. In the batch process, a batch of one or more glass-laden molds is introduced into a furnace or kiln which is heated gradually to a temperature sufficient to cause the glass to sag into conformance with the shaping surface of the mold.

In bending glass sheets to cylindrical or conical shapes, a flat glass sheet is supported on a pair of oblique slides located beyond either side of a mold onto which the glass sheet sags by gravity when heated to its deformation temperature. The mold has an upward facing surface conforming to the outline contour and elevational shape desired for the shaped glass sheet. It is convenient that the flat glass sheet slide and sag at both of its opposite ends at an equal rate so as to be in proper alignment with the shaping surface of the mold upon which it is received. To accomplish this end, it is necessary to maintain the sheet in proper alignment with the surface that supports the glass in sliding relation thereon during its conversion from a flat shape to its ultimate shape so that its rate of sliding is uniform from one side edge to the other side edge. Unless non-uniform sliding of the glass sheet between its opposite edges is prevented, the sagging sheet deviates from its desired shape when finally supported on the outline mold.

A uniform temperature must be maintained within the furnace or kiln in which shaping takes place. Unless a uniform temperature is maintained, the glass sheet will slide by a combination of heat sagging and gravity along one obliquely disposed sliding surface more rapidly than the other obliquely disposed sliding surface. Under circumstances where the temperature in the kiln or furnace is not uniform, one edge of the glass sheet is likely to slide more rapidly down the slide and arrive at the mold shaping surface more rapidly than the side edge of the glass sheet opposite the first side edge arriving at the mold surface. The shaped glass sheet thus may either fall off the mold if the latter is of the outline type or will slide to the point where it is non-uniformly shaped with respect to the center of the glass. Such non-uniform shaping makes it difficult if not impossible to laminate the shaped glass sheet to other plies in forming a laminated transparency for aircraft.

2. Description of the Prior Art

U.S. Pat. No. 2,377,849 to Binkert and Jendrisak discloses a gravity sag mold having an air passage through which vaccum is applied by suction to enable the glass sheet to sag into conformity with the shaping surface of a gravity sag-type bending mold without forming air pockets between the lower surface of the glass and the upper surface of the mold. The elimination of air pockets allows the glass to conform closely to the shape of the mold.

U.S. Pat. No. 3,560,182 to Golightly discloses a gravity sag bending mold that provides a series of horizontally extending circumferential ridges extending in a horizontal plane in an inward direction from a slide member disposed over a support ring. The purpose of the ledges is to retard the sliding of a portion of the periphery of the glass that causes tilting because of non-uniform sliding at different portions of the periphery. This non-uniform sliding may be caused by non-uniform heating of the glass or many other causes, such as the glass being of non-uniform thickness so that the thicker regions tend to resist sliding to a greater extent than the thinner regions, or different portions of the kiln or furnace may be hotter than other portions so as to impart a non-uniform heating pattern onto the glass.

In the case of a continuous bending operation where the glass supporting mold moves continuously through a lehr that has an increasing temperature gradient along the path of glass travel, the leading edge of the glass is continuously exposed to a higher temperature than the trailing edge throughout its movement through the lehr and softens more rapidly. A hotter portion of the glass sheet marginal portion is more fluid and, hence, slides more readily than a colder portion. This non-uniformity in sliding would cause the glass to tilt away from its desired orientation relative to the mold shaping surface. Tilting of the glass promotes deviation from the desired shape.

Whatever the reason may be for the glass sagging non-uniformly, the Golightly invention remedies this problem by mechanical means that interrupt the free sliding of a portion of the periphery that reaches one of several pre-determined intermediate locations between the original position occupied by the flat glass sheet when first mounted over the mold for shaping and the final position the glass sheet occupies when the glass is bent to substantially its desired shape. The mechanical means interrupts the free sliding of the peripheral portion that slides more rapidly than another portion of the periphery. Thus, mechanical interuption in sliding permits the slowest sliding marginal portion to catch up with the fastest sliding marginal portion and thus re-orients the glass in a horizontal plane when the reoriented glass is permitted to slide over the interruption and slide freely once again.

SUMMARY OF THE INVENTION

In the method of shaping a glass sheet by gravity sagging according to the present invention wherein the glass sheet is supported along an opposite pair of edges on oblique supports in shaping relation over an outline shaping mold, and the glass sheet is heated until it softens to sag and slide along said oblique supports and into conformity with the upper surface of the outline mold, the present invention comprises observing the relative progress of said sagging and sliding of the opposite glass sheet edges. When one of the opposite glass sheet side edges is observed to sag and slide more rapidly than the other of said opposite glass sheet side edges, cooling fluid is selectively applied against the glass sheet adjacent one of the opposite glass sheet side edges while refraining from applying cooling fluid against the remainder of the glass sheet. This selective application of cooling fluid is discontinued when both of the glass sheet side edges are in approximate horizontal alignment with one another.

The cooling fluid is preferably applied along an elongated area that is generally aligned with the one glass sheet side edge that sags and slides more rapidly. The cooling is preferably applied through a series of apertures in an apertured pipe spaced along a line of apertures that is aligned with the elongated area that is selectively cooled. The steps may be repeated several times during the course of shaping the sheet by gravity sag bending.

Apparatus for performing the method of the present invention comprises an outline shaping mold having a pair of obliquely upward and outwardly extending slide members for supporting the opposite side edges of a glass sheet to be bent. The apparatus also comprises a pair of apertured pipes extending substantially parallel to the length of the obliquely upward and outwardly extending slides. Means is provided for furnishing cooling fluid under pressure to either of said apertured pipes as desired. The application of cooling fluid through a pipe adjacent the side edge of the glass that is sagging and sliding more rapidly than the opposite side edge serves a similar purpose to the mechanical means used in the Golightly patent to interrupt the free sliding and sagging of a portion of the edge of the glass that moves more rapidly than another side edge portion of the glass. However, the method of the present invention provides a greater degree of control over the degree of interruption of the sliding of the more rapidly moving side edge and performs this feature without causing any marking of the supported glass surface inward of its marginal edge — a defect that sometimes resulted from using the apparatus of the Golightly patent.

The above and other benefits of the present invention will be better understood in the light of a description of specific embodiments of the present invention that follows.

BRIEF DESCRIPTION OF THE DRAWINGS

In the drawings that form part of the description of the present invention, and wherein like structural numbers refer to like structural elements.

DESCRIPTION OF THE PREFERRED EMBODIMENTS

Figure 1:
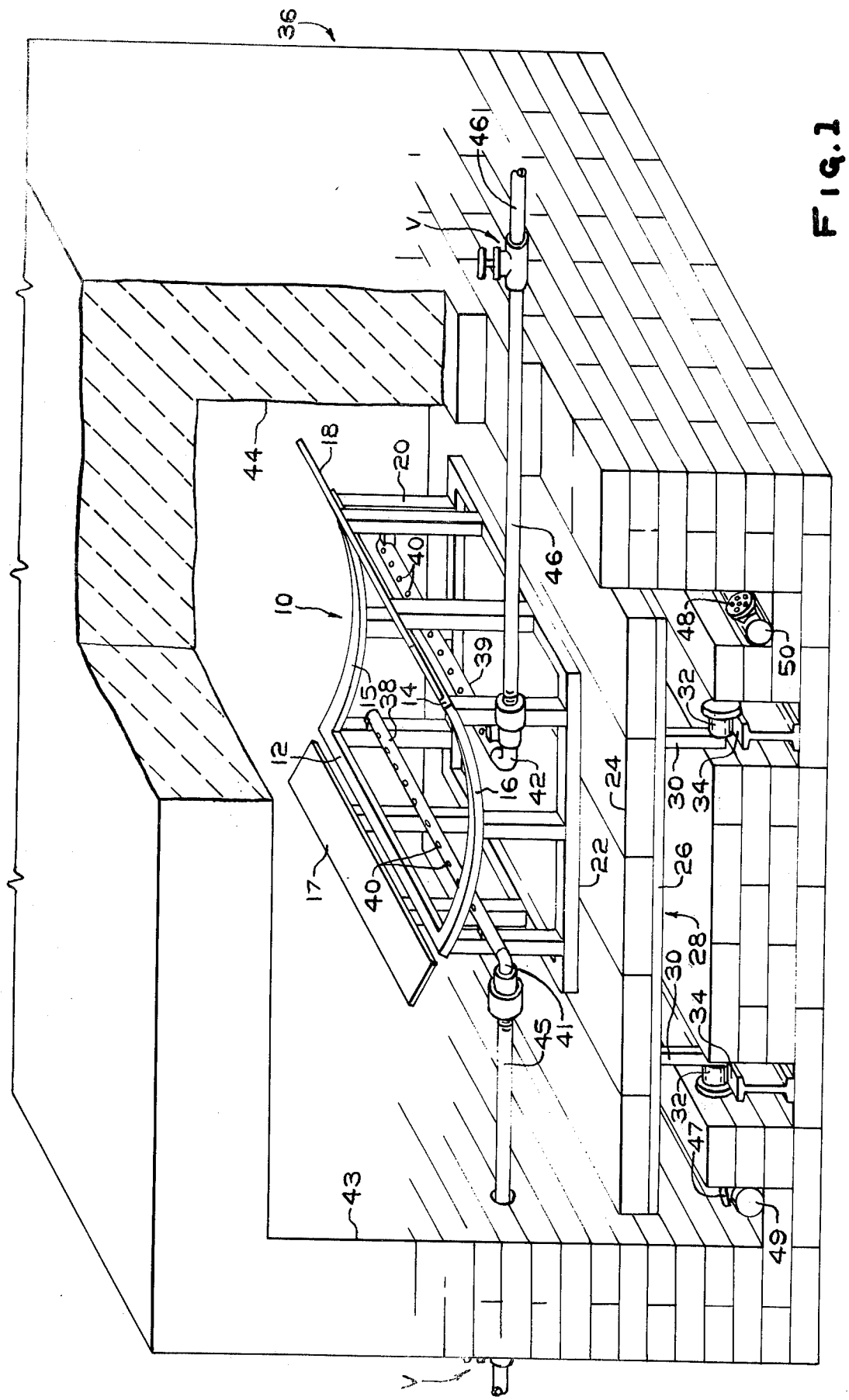
FIG. 1 is a fragmentary perspective view of a first embodiment of the present invention designed to shape a flat glass sheet into a cylindrical shape.

The embodiment depicted in FIGS. 1 to 4 comprises a ring-type mold 10 comprising a first elongated shaping rail 12, a second elongated shaping rail 14 disposed parallel to said first elongated shaping rail 12 and curved end shaping rails 15 and 16 interconnecting the corresponding ends of the elongated shaping rail 12 and 14 to one another. An oblique slide 17 extends obliquely upward and laterally outward from its laterally inner end adjacent the laterally outer side of elongated shaping rail 12, and another oblique slide 18 extends obliquely upward and laterlly outward from its lateral inner end adjacent the laterally outer side of elongated shaping rail 14. A plurality of mold rail supports 20 are provided to support the shaping rails and the slides relative to a mold frame 22. The latter rests generally horizontally on a ceramic bed 24 supported by a floor 26 of a carriage 28. The carriage 28 is provided with a plurality of wheel support brackets 30 each supporting a wheel 32. The wheels are rotatably supported along a pair of carriage rails 34. The latter extend from outside a kiln or furnace 36 to within the interior of the kiln or furnace.

The mold 10 is also provided with a pair of apertured pipes 38 and 39. The pipes are arranged within the outline of the ring-type mold 10 and are disposed below and slightly interior of the elongated shaping rails 12 and 14 with their apertures 40 facing upward so that when cooling fluid is applied to the pipes under pressure, the fluid is imparted through the apertures 40 in an upward direction toward the bottom surface of a glass sheet G supported in bending relation to the shaping mold 10.

Each of the apertured pipes 38 and 39 is closed at one end and has an open end at its other end. An elbow connection 41 is connected to the open end of apertured pipe 38. A corresponding elbow connection 42 is connected to the open end of apertured pipe 39. The kiln or furnace 36 is provided with a pair of furnace sidewalls 43 and 44. Each of the furnace sidewalls is apertured to receive an air line. An air line 45 extends through the aperture in sidewall 43 and has an externally threaded inner end which is adapted for connection to an internally threaded portion of elbow 41. Furnace sidewall 44 is similarly apertured to receive an air line 46. The latter is also externally threaded at its inner end to be secured to elbow 42. Both of the elbows 41 and 42 are internally threaded with threads that match the external threads of the respective air lines 45 and 46. Each of the air lines is connected to a source of air under pressure and is provided with a valve V to selectively apply air when desired through either air line 45 or air line 46 according to the dictates of the present invention.

The furnace or kiln is provided with a pair of gas burners 47 and 48. A gas supply conduit 49 provided gas to gas burner 47 and an additional gas supply conduit 50 provides gas for the gas burner 48.

In a typical glass sheet shaping operation, a glass sheet of predetermined contour and size is mounted on the slides 17 and 18 outside the kiln 36. The mold 10 rests on the carriage 28 and the carriage is moved into the kiln 36. The door to the kiln (not shown) is closed and gas is supplied to the gas burners so as to heat the interior of the kiln 36. Air lines 45 and 46 are inserted through the sidewalls 43 and 44 of the kiln 36 and are threaded to their respective elbow connections 41 and 42. The outer end of the air lines are connected to a supply of air through the valves V and the sagging and sliding of the glass sheet G relative to the ring-type or skeleton mold 10 is observed through windows in the kiln.

Figure 2:
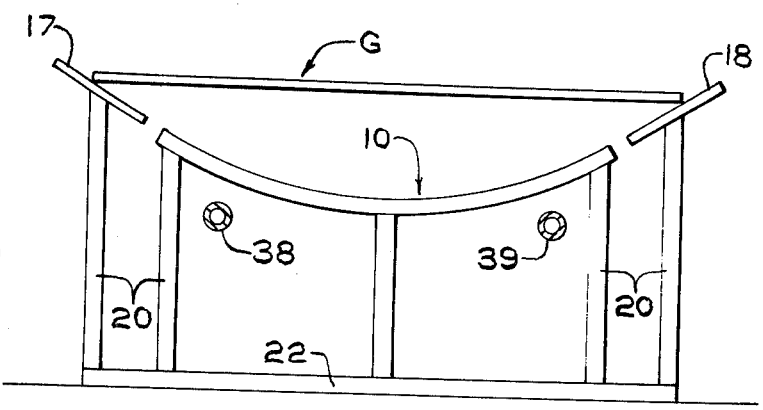
FIG. 2 is a fragmentary, diagrammatic, transverse sectional view of the mold of FIG. 1 showing the arrangement of a flat glass sheet mounted on the oblique slides above the mold preparatory to shaping by a gravity sagging technique.
Figure 3:
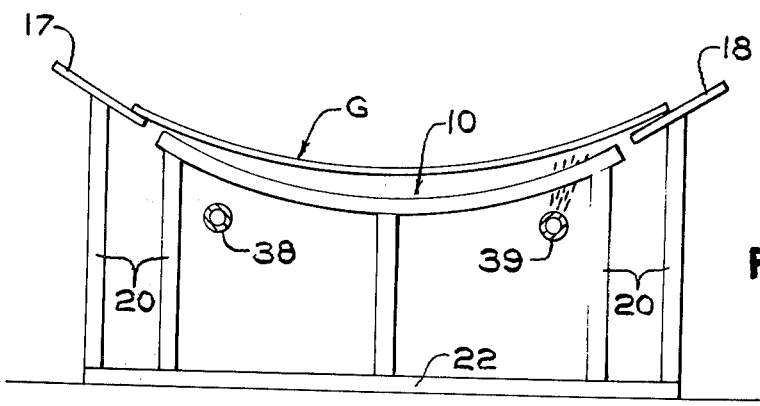
FIG. 3 is a view similar to FIG. 2, showing the glass sheet in an intermediate stage of bending wherein one side edge of a pair of opposite side edges has started to sag and slide more rapidly than the other of said opposite side edges, whereby cooling fluid is selectively applied against an elongated area of the glass sheet adjacent the more slowly sliding side edge.
Figure 4:
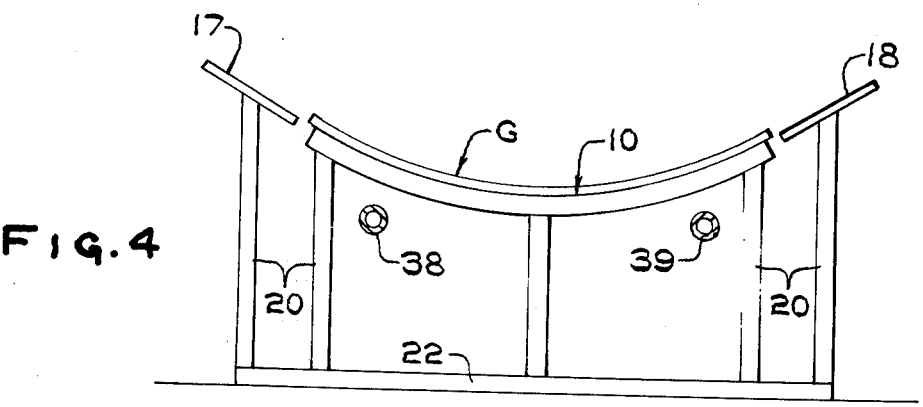
FIG. 4 is a view similar to those of FIGS. 2 and 3 showing the glass sheet mounted on the mold after completion of the shaping operation depicted in FIGS. 2 and 3.

The initial position of the glass sheet relative to the slides and mold is depicted in FIG. 2. If one side of the glass slides and sags more rapidly than the opposite side edge, an observer is able to see this uneven sliding and apply air through one of the pipes 38 or 39. In the example depicted in FIG. 3, the glass has slid more rapidly down on slide 17 than on slide 18. This requires the application of cooling fluid through the apertures 40 of pipe 39. No air is supplied to pipe 38 at this time. The application of cooling fluid, such as air, is continued through pipe 39 until the two side edges of the glass are in approximate horizontal alignment with one another. The valve is then turned off so that no air is provided through pipe 39, and the glass sheet G continues to slide down both slides of the mold 10 until an unevenness is again observed. If such unevenness in sliding is again observed, the appropriate pipe is provided with air to furnish cooling fluid along an elongated area approximately parallel to and opposite to the respective slide that supports the side edge of the glass that is sagging and sliding more rapidly. This process continues until such time as the curved glass sheet sags into conformity with the shaping mold 10 as depicted in FIG. 4.

Glass sheets 78 inches (198 centimeters) long by 60 inches (152 centimeters) wide have been bent to a cylindrical bend having a 50 inch (127 centimeters) radius of curvature and the glass plates used to press polish polycarbonate sheets used in laminated transparencies for the B-1 bomber. The sagging of the glass has been controlled using stainless steel pipes ⅜ inch (0.95 centimeter) in diameter having 1/16 inch (0.16 centimeter) diameter holes drilled 3 inches (7.6 centimeters) apart. Air was supplied at approximately 1 pound per square inch (68.9 kilograms per square meter) pressure to control the sagging of the more rapidly sliding side edge of the glass sheet.

The glass sheets so produced with a cylindrical bend have been used to press polish polycarbonate sheets 72 inches (183 centimeters) long by 56 inches (142 centimeters) wide.

Figure 5:
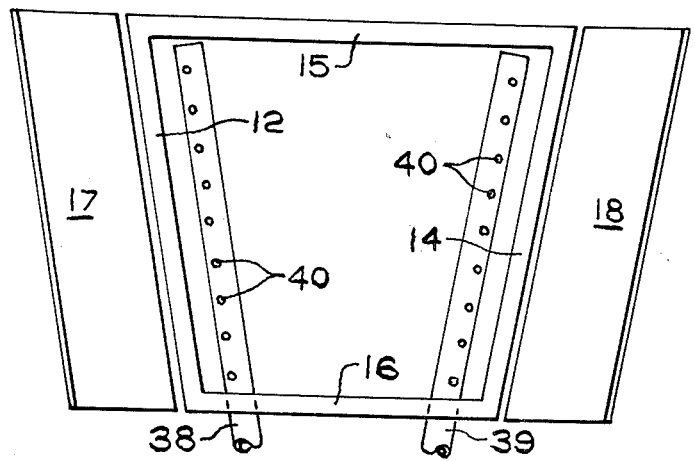
FIG. 5 is a plan view of an alternate embodiment of gravity sag shaping mold for producing conical bends which differ from the cylindrical bends produced by the mold depicted in FIGS. 1 to 4.

The present invention is also suitable for use with molds capable of shaping glass sheets into conical shapes as well as cylindrical shapes. FIG. 5 shows a plan view of an alternate embodiment for shaping glass sheets to conical shapes. The apparatus is similar to that depicted in FIGS. 1 to 4, except for the fact that the slides 17 and 18 diverge from one another as do the elongated shaping rails 12 and 14 and the apertured pipes 38 and 39. These diverge in a manner similar to the shape to be imparted to the glass. The upper surfaces of the curved end shaping rails 15 and 16 are of different length and shape, one defining a 26 inch (66 centimeters) radius and another defining a 30 inch (76.2 centimeters) radius for a part produced in conjunction with the fabrication of a conically shaped element for a transparency for the F-111 aircraft. A conical bend is produced from a rectangular sheet 64 inches (163 centimeters) long and 49 inches (124 centimeters) wide which is cut subsequent to bending to a length of 49⅜ inches (125.4 centimeters) with its width tapering from 38 inches (97 centimeters) in its widest region to 25 inches (64 centimeters) wide in its narrow region. Such parts have been used in producing parts for the F-111 aircraft.

The embodiments described above have been described in terms of an operation involving a kiln in which the operation performed is a batch type operation wherein a batch of one or more glass sheets are shaped at one time. The batch is inserted within the kiln. The air lines are attached to the apertured pipes and pressurized cooling fluid is applied when necessary. The air lines are disconnected from the pipes when shaping is completed. It is also possible to use this invention in a continuous operation wherein a tunnel-type bending lehr has a pair of elongated slots disposed in its sidewalls to permit molds to move continuously through the lehr and cooling fluid is selectively applied whenever needed to one or the other of the apertured pipes provided below and within the outline of the shaping surface of the outline or ring-type mold.

The form of the invention shown and described in this disclosure represents an illustrative preferred embodiment and certain modifications thereof. It is understood that various changes may be made without departing from the gist of the invention as defined in claimed subject matter which follows.

I claim:

1. In the method of shaping a glass sheet by gravity sagging comprising supporting said sheet along an opposite pair of edges on oblique supports in shaping relation over an outline shaping mold, heating said glass sheet until it softens to sag and slide along said oblique supports and into conformity with the upper surface of said outline mold, the improvement comprising:
   (1) observing the relative progress of said sagging and sliding of said opposite glass sheet side edges, and when one of said opposite glass sheet edges is observed to sag and slide less rapidly than the other of said opposite glass sheet edges,
   (2) selectively applying cooling fluid against said glass sheet adjacent said one glass sheet side edge while refraining from applying cooling fluid against the remainder of said glass sheet, and (3) discontinuing said selective application when both said glass sheet side edges are in approximate horizontal alignment with one another.

2. In the method as in claim 1, wherein said cooling fluid is applied along an elongated area that is generally aligned with said one glass sheet edge that sags and slides less rapidly.

3. In the method as in claim 2, wherein said cooling fluid is applied through a series of apertures spaced along a line of apertures that is aligned with said elongated area.

4. In the method as in claim 1, wherein one or the other of said glass sheet edges begins to sag and slide more rapidly than the said edge opposite thereto after said selective application of cooling fluid is discontinued characterized by selectively applying cooling fluid against said glass sheet adjacent the glass sheet side edge that sags and slides less rapidly after said first selective application of cooling fluid is discontinued.

5. Apparatus for shaping a glass sheet by gravity sagging comprising an outline mold having an upper surface conforming in elevation and outline to the shape desired for the glass sheet after shaping, a pair of elongated slides extending obliquely upwardly and outwardly in a transverse direction from adjacent a pair of opposite side edges of said outline mold, a pair of apertured pipes extending lengthwise across the length of said mold in a direction approximately aligned with the length of an adjacent slide in a plane below said mold, each said pipe having apertures oriented to direct fluid upwardly adjacent each side edge of said outline shaping mold onto said glass sheet thereon, means to supply cooling fluid through a selected one or other of said pipes and separate valve means interposed between said cooling fluid supply means and each of said apertured pipes to control the selection of flow of cooling fluid through said one of said pipes.

6. Apparatus as in claim 5, adapted for shaping a glass sheet to a cylindrical configuration characterized by said elongated slides extending parallel to one another and said apertured pipes extending substantially parallel to the length of said elongated slides at an elevation below that occupied by said elongated slides.

7. Apparatus as in claim 5, adapted for shaping a glass sheet to a conical configuration characterized by said elongated slides extending in diverging relation to one another, one of said apertured pipes being arranged with its length approximately in parallel relation to one of said elongated slides and the other of said apertured pipes being arranged with its length approximately in parallel relation to the other of said elongated slides.

* * * * *